United States Patent
Wang et al.

(10) Patent No.: US 9,113,194 B2
(45) Date of Patent: Aug. 18, 2015

(54) METHOD AND SYSTEM FOR INTERLEAVING VIDEO AND DATA FOR TRANSMISSION OVER A NETWORK AT A SELECTED BIT RATE

(75) Inventors: Limin Wang, San Diego, CA (US); Xue Fang, San Diego, CA (US); Vivian Kung, San Diego, CA (US); Ajay Luthra, San Diego, CA (US); Yinqing Zhao, San Diego, CA (US); Jian Zhou, Fremont, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 1071 days.

(21) Appl. No.: 11/960,446

(22) Filed: Dec. 19, 2007

(65) Prior Publication Data

US 2009/0161697 A1 Jun. 25, 2009

(51) Int. Cl.
*H04N 21/434* (2011.01)
*H04N 21/2343* (2011.01)
*H04N 21/2365* (2011.01)
*H04N 21/2383* (2011.01)
*H04N 21/2385* (2011.01)
*H04N 19/40* (2014.01)

(52) U.S. Cl.
CPC .......... *H04N 21/4347* (2013.01); *H04N 19/40* (2014.11); *H04N 21/2365* (2013.01); *H04N 21/2383* (2013.01); *H04N 21/2385* (2013.01); *H04N 21/23655* (2013.01); *H04N 21/234354* (2013.01)

(58) Field of Classification Search
CPC .......... H04N 19/40; H04N 21/234354; H04N 21/2365; H04N 21/23655; H04N 21/2383; H04N 21/2385; H04N 21/4347
USPC .......................................... 370/538
See application file for complete search history.

(56) References Cited

U.S. PATENT DOCUMENTS

| | | | | |
|---|---|---|---|---|
| 5,995,490 A * | 11/1999 | Shaffer et al. | ................. | 370/260 |
| 6,233,238 B1 | 5/2001 | Romanowski et al. | | |
| 6,493,388 B1 * | 12/2002 | Wang | ....................... | 375/240.12 |
| 6,643,327 B1 * | 11/2003 | Wang | ....................... | 375/240.12 |
| 6,795,506 B1 * | 9/2004 | Zhang et al. | ............. | 375/240.26 |
| 2002/0018645 A1 | 2/2002 | Nakamatsu et al. | | |
| 2004/0109435 A1 * | 6/2004 | Alasti et al. | .................. | 370/350 |
| 2004/0202248 A1 * | 10/2004 | Boroczky et al. | ........ | 375/240.12 |
| 2006/0039473 A1 * | 2/2006 | Filippini et al. | ......... | 375/240.16 |
| 2006/0224762 A1 | 10/2006 | Tian et al. | | |

OTHER PUBLICATIONS

PCT International Search Report, Re: PCT Application #PCT/US08/86182 Dec. 10, 2008.

* cited by examiner

*Primary Examiner* — Huy D Vu
*Assistant Examiner* — Stephen J Clawson
(74) *Attorney, Agent, or Firm* — Lori Anne D. Swanson (57) ABSTRACT

A StatMux system and method are provided for efficiently allocating time slots on the transmission channel between bit streams representing video and bit streams representing data. By providing such a system and method, when a decreased number of data bits need to be transmitted, a decreased number of time slots may be allocated for transmitting the data bits and an increased number of time slots may be allocated for transmitting video bits. When a decreased number of video bits needs to be transmitted, a decreased number of time slots may be allocated for transmitting video bits and an increased number of time slots may be allocated for transmitting data bits.

23 Claims, 8 Drawing Sheets

METHOD AND SYSTEM FOR INTERLEAVING VIDEO AND DATA FOR TRANSMISSION OVER A NETWORK AT A SELECTED BIT RATE

TECHNICAL FIELD OF THE INVENTION

The invention relates to transmitting video and data over networks. More particularly, the invention relates to interleaving video bits and data bits to achieve a bit stream of combined video and data bits having a selected bit rate for transmission over a network.

BACKGROUND OF THE INVENTION

Within the last few years, progress in digital technology has made the widespread use of compressed digital video signals practical. Standardization of common compression methods has resulted in the availability of new services and products. The Moving Picture Experts Group (MPEG) began in 1988 as a working group with the aim of defining standards for digital compression of audio-visual signals. The first MPEG standard, MPEG-1, was published in 1993 as a three-part standard defining audio and video compression coding methods and a multiplexing system for interleaving bits representing audio and video signals so that they can be played back together. MPEG-1 principally supports video coding up to about 1.5 megabits per second (Mb/s), providing quality similar to VHS and stereo audio at 192 b/s. MPEG-1 is used in the CD-i and Video-CD systems for storing video and audio on CD-ROM.

In 1995, MPEG published the MPEG-2 standard, which provides compression coding methods for coding standard-definition television at bit rates from about 3 to 15 Mb/s and for coding high-definition television at 15 to 30 Mb/s. MPEG-2 extends the stereo audio capabilities of MPEG-1 to multi-channel surround sound coding. MPEG-2 decoders will also decode MPEG-1 bit streams. In the MPEG-1 and -2 standards, the red, green and blue (RGB) video signals coming from a color camera are expressed as luminance (Y) and chrominance (UV) components. The chrominance bandwidth may be reduced relative to the luminance without significantly affecting the picture quality. The component (YUV) video signals are sampled and digitized to form discrete pixels. The terms 4:2:2 and 4:2:0 are often used to describe the sampling structure of the digital picture. The term 4:2:2 means that the chrominance is horizontally subsampled by a factor of two relative to the luminance, while the term 4:2:0 means that the chrominance is horizontally and vertically subsampled by a factor of two relative to the luminance.

Figure 1:
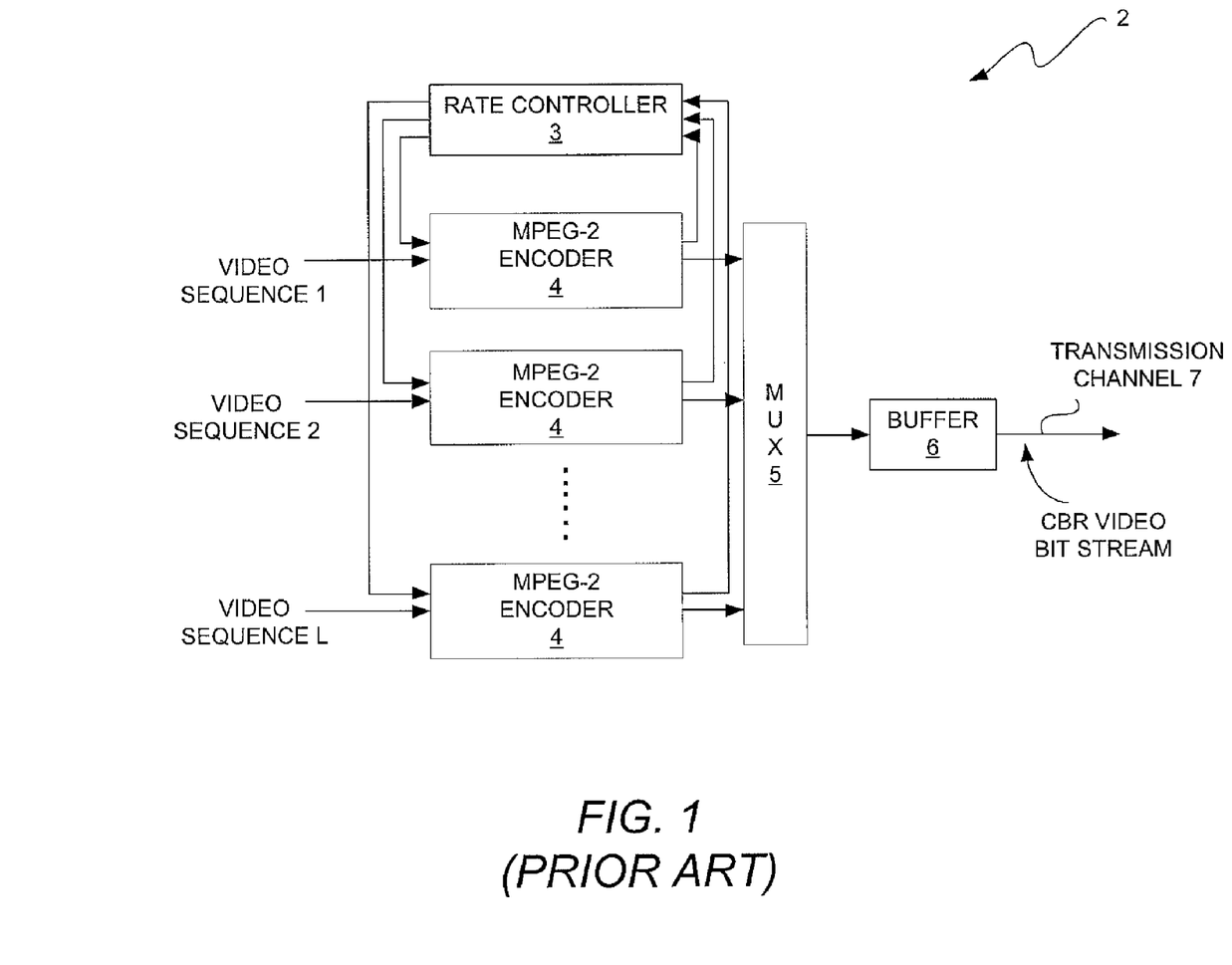
FIG. 1 illustrates a block diagram of a typical statistical time division multiplexing (StatMux) system that is used to interleave multiple video signals.

FIG. 1 illustrates a block diagram of a typical statistical time division multiplexing (StatMux) system 2 that is used to interleave multiple video signals. The StatMux system 2 has a rate controller 3, multiple MPEG-2 encoders 4 and a multiplexer (Mux) 5. Each of the encoders 4 receives a video sequence and performs MPEG-2 compression and coding algorithms to produce a compressed and coded bit stream, which is then output to the MUX 5. The bit stream that is output from each of the encoders 4 and received by the Mux 5 may be a variable bit rate (VBR) bit stream. The bit streams output from the encoders 4 are also received by the rate controller 3, which processes the bit streams and outputs respective control signals to the encoders 4. The rate controller 3 processes the respective bit streams output from the respective encoders 4 to determine the amount by which the respective VBRs of the respective encoders 4 should be adjusted. The control signals output from the rate controller 3 and received by the encoders 4 cause the encoders 4 to adjust their respective compression/coding algorithm parameters to obtain an increased or decreased VBR. In general, the VBR depends on the complexity and predictability of the source picture and the effectiveness of motion-compensated prediction. For example, the VBRs of the encoders 4 may be decreased by increasing the degree of quantization applied during compression/coding, and vice versa. In FIG. 1, some or all of the encoders 4 may be transcoders.

The Mux 5 multiplexes the respective bit streams output from the respective encoders 4 and outputs the StatMux bits at the output of Mux 5. These bits may be stored in a buffer 6 before being transmitted over a network. The interleaved video bits will subsequently be read out of the buffer 6 at a constant bit rate (CBR) and transmitted over the network at the CBR.

The StatMux system 2 works well at adjusting the VBRs of the encoders 4, which, in effect, means that the encoders 4 vie for time slot space in the transmission channel 7 in accordance with their needs. This, in turn, results in a more efficient use of transmission line time because channels that are inactive are not allocated time slots, and channels that are less active are allocated fewer time slots than channels that are more active. The StatMux system 2 does not, however, address the allocation of time slots between video and data. For example, if the network is the Internet, the CBR video bit stream output from the Mux 5 or output from the buffer 6 must share the available bandwidth of a network channel (not shown) over which the data and the video are transmitted. The data may be any type of data, such as, for example, hypertext transfer protocol (http) data, ActiveX data, Java data, JavaScript data, cookies, etc. Currently, no mechanism exists for efficiently allocating time slots between the video bit stream and a data bit stream. Without such a mechanism, it is possible that services or products that rely on the transmission of video will fail or that performance of those services or products will be degraded.

Accordingly, a need exists for a system that efficiently allocates time slots between bit streams representing video and bit streams representing data.

SUMMARY OF THE INVENTION

A StatMux system and method are provided in which bit streams corresponding to video and bit streams corresponding to data are multiplexed for transmission together over a transmission channel. The StatMux system comprises one or more transcoders, a data channel, a Mux, and a rate controller. Each transcoder is configured to receive a respective video bit stream on a respective video program channel and to transcode the respective video bit stream to produce a respective transcoded video bit stream, which is then output from the respective transcoder at a respective bit rate. The Mux receives the respective transcoded video bit streams and the data bit stream and time division multiplexes the transcoded video bit streams and the data bit stream to produce an output bit stream of combined video bits and data bits. The rate controller receives information contained in the respective transcoded video bit streams output from the respective transcoders and processes the information to produce respective control signals, which are then output to the respective transcoders. Each of the respective control signals output from the rate controller to the respective transcoders includes a set of global quantization parameters comprising at least one global quantization parameter. The set of global quantization parameters are used by each transcoder to adjust a quantization process performed in each transcoder. The adjustment of the quantization process results in adjustments in the respective bit rates of the respective transcoded video bits output from the respective transcoders.

The method comprises receiving respective video bit streams on respective video program channels in one or more respective transcoders and transcoding the respective video bit stream to produce respective transcoded video bit streams, outputting the respective transcoded video bit streams from the respective transcoders at respective bit rates, providing a data channel in that carries a stream of data bits, receiving the respective transcoded video bit streams and the data bit stream in a Mux that time division multiplexes the bit streams to produce an output bit stream of combined video bits and data bits, receiving information contained in the respective transcoded video bit streams output from the respective transcoders in a rate controller, processing the received information to produce respective control signals that are output to the respective transcoders, and receiving the respective control signals in the respective transcoders and adjusting the respective bit rates of the respective transcoded video bit streams output from the respective transcoders based on the respective control signals. Each of the respective control signals output from the rate controller to the respective transcoders includes a set of global quantization parameters, which comprises at least one global quantization parameter. Each transcoder uses the set of global quantization parameters contained in the respective control signal to adjust a quantization process performed in each transcoder. The adjustment of the quantization process results in an adjustment in the respective bit rates of the respective transcoded video bits output from the respective transcoders.

These and other features and advantages of the invention will become apparent from the following description, drawings and claims.

DETAILED DESCRIPTION OF AN ILLUSTRATIVE EMBODIMENT

In accordance with the invention, a StatMux system and method are provided for efficiently allocating time slots on the transmission channel between bit streams representing video and bit streams representing data. By providing such a system and method, when a decreased number of data bits need to be transmitted, a decreased number of time slots may be allocated for transmitting the data bits and an increased number of time slots may be allocated for transmitting video bits. Likewise, when a decreased number of video bits need to be transmitted, a decreased number of time slots may be allocated for transmitting video bits and an increased number of time slots may be allocated for transmitting data bits.

A relatively new video coding standard known as H.264 was recently developed by the International Telecommunications Union (ITU). This standard provides a large number of coding algorithms that have been collectively dubbed "Advanced Video Coding" (AVC), which compress video images in accordance with an MPEG-4 standard. AVC provides for coding an interlaced video frame as a single frame picture in frame mode or as two separate field pictures in field mode. With AVC, the coding algorithms adaptively switch between frame and field coding mode on a per-frame basis. For a (frame or field) picture, AVC allows four picture (or slice) types, namely, types I, P, Bs and B. A picture or slice that is coded as type I is coded without reference to any other picture/slice in the sequence of pictures/slices. Only spatial prediction is applied to macroblocks (MBs) of type I. Pictures/slices that are coded as types P, Bs and B are coded using temporal prediction based on pictures/slices that were coded earlier in the sequence. For the types P, Bs and B pictures/slices, the reference pictures/slices may be any previously coded picture/slice of types I, P and Bs. Both spatial and temporal predictions can be applied to MBs in P, Bs and B.

In accordance with the invention, a StatMux system and method are provided that utilize one or more AVC transcoders that receive pre-compressed AVC input video bit streams and output AVC-compressed video bit streams that are multiplexed by a Mux along with a data bit stream to produce a combined video and data bit stream. The combined video and data bit stream is output from the StatMux system at a selected bit rate. A rate controller of the StatMux system controls the AVC coding performed by each of the AVC transcoders to allow their respective video bit stream bit rates to be adjusted to ensure that the combined video and data bit stream output from the StatMux onto the transmission channel is at the selected bit rate.

Figure 2:
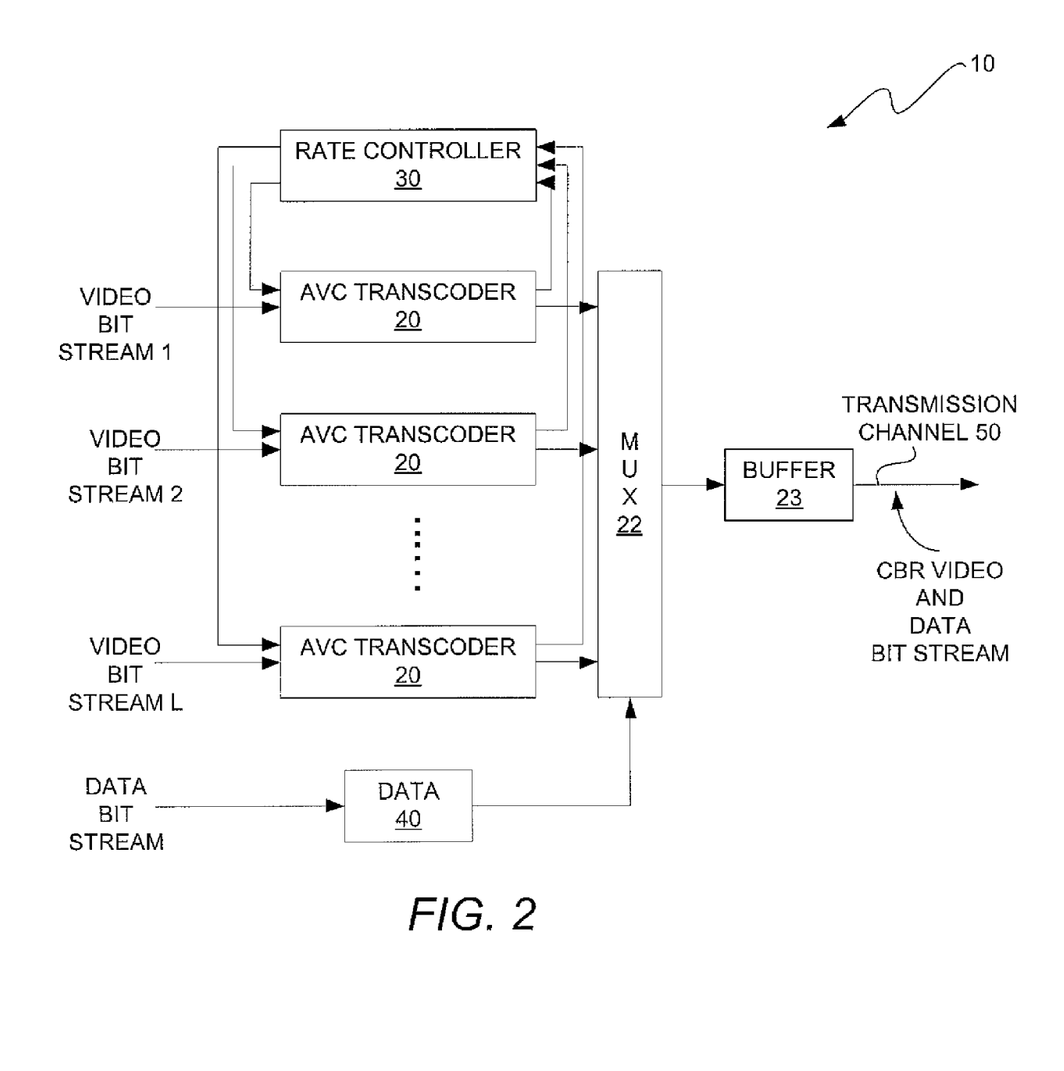
FIG. 2 illustrates a block diagram of the StatMux system of the invention in accordance with an illustrative embodiment.

FIG. 2 illustrates a block diagram of the StatMux system 10 of the invention in accordance with an illustrative embodiment. The StatMux system 10 typically includes a plurality of AVC transcoders 20, a rate controller 30, a Mux 22, and a buffer 23. The StatMux system 10 also includes a Data block 40, which may be, for example, a Data In queue that temporarily stores the data bits before outputting the data bits to the Mux 22. The Data block 40 may, alternatively, simply be a Data In port that receives a Data bit stream from some Data source. The Data bit stream may be at a VBR or at a CBR.

The Mux 22 also receives the respective video bit streams output from the respective AVC transcoders 20. The bit streams 1 through L correspond to video programs 1 through L, respectively, comprising video bits. Although a plurality of AVC transcoders 20 are shown in FIG. 2, the StatMux system 10 may include one or more of the AVC transcoders 20. Similarly, although only one Data block 40 is shown in FIG. 2, the StatMux system 10 may include one or more Data blocks 40 corresponding to one or more respective Data bit streams.

The rate controller 30 processes information contained in the video bit streams output from the AVC transcoders 20 and determines an amount by which the AVC coding parameters of each of the transcoders 20 should be adjusted to achieve a desired VBR for each video bit stream output from each transcoder 20. The rate controller 30 preferably also processes information contained in the video bit streams input to the AVC transcoders 20 in order to calculate a combined input bit rate for all of the video programs 1 through L. The rate controller uses the calculation of the combined video input bit rate when making computations to determine the amount by which the AVC coding parameters of each of the transcoders 20 should be adjusted to achieve a desired VBR for each video bit stream output from each transcoder 20.

The Mux 22 selects each of the inputs from the AVC transcoders 20 and from the Data block 40 at respective times such that respective time slots on the transmission channel 50 are allocated between video bits and data bits. The buffer 23 is optional. If the buffer 23 is implemented in the StatMux system 10, the output of the StatMux system 10 is the output of the buffer 23. If the buffer 23 is not implemented in the StatMux system 23, the output of the StatMux system 10 is the output of the Mux 22. In either case, the time slots are allocated by the Mux 22 in such a way that the combined video and data bit stream output from the StatMux system 10 is at a selected CBR. It should be noted that the data rate may be equal to or greater than zero. In the case where the data rate is zero, i.e., when there is no data to send, preferably all of the time slots are allocated to the video bit streams output from the AVC transcoders. Thus, in this case, the "combined video and data bit stream rate", as that term is used herein, refers to the bit rate of the combined video bit streams. In accordance with one embodiment, a minimum data bandwidth is maintained regardless of whether or not there is actual data to send.

Figure 3:
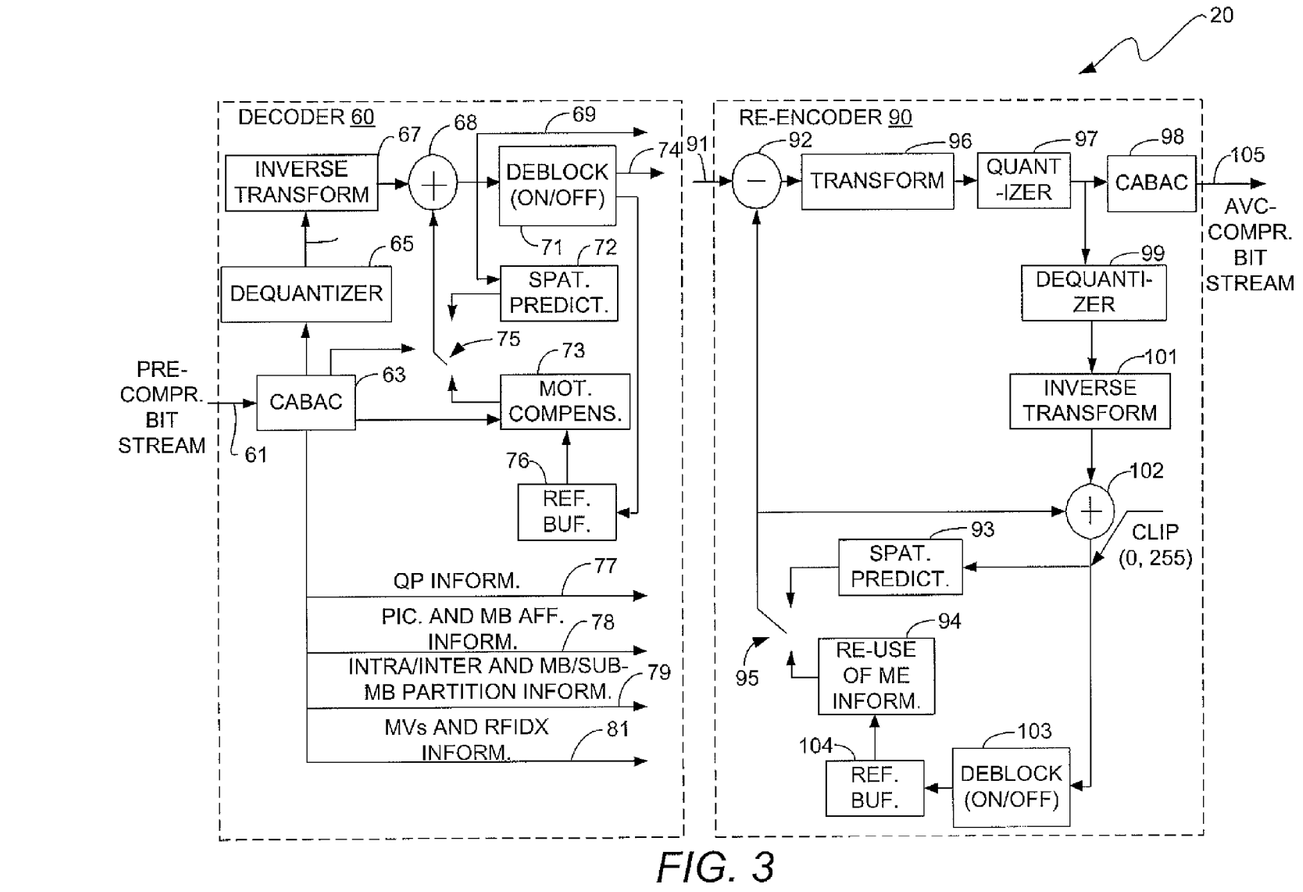
FIG. 3 illustrates a block diagram of one of the AVC transcoders shown in FIG. 2 in accordance with an illustrative embodiment.

FIG. 3 illustrates a block diagram of one of the AVC transcoders 20 shown in FIG. 2 in accordance with an illustrative embodiment. In accordance with this illustrative embodiment, each AVC transcoder 20 includes a decoder 60 and a re-encoder 90. As indicated above, the video bit streams 1 through L input to the AVC transcoders 20 of the StatMux system 10 correspond to respective video programs 1 through L. These bit streams may be VBR or CBR bit streams and are pre-compressed bit streams. The term "pre-compressed", as that term is used herein, means that the video programs have already been compressed using an AVC compression algorithm prior to being delivered to the decoder 60. These pre-compressed AVC video bit streams are at first bit rates when they are received by the AVC transcoders 20. The decoder 60 of each AVC transcoder 20 converts the pre-compressed video bit stream into a reconstructed video signal, and then outputs the reconstructed video signal to the re-encoder 90 of the AVC transcoder 20. The re-encoder 90 re-encodes the reconstructed video signal using an AVC algorithm and outputs an AVC-compressed bit stream to the Mux 22 (FIG. 2). The Mux 22 then interleaves the AVC-compressed bit stream with other AVC-compressed bit streams from the other AVC transcoders 20 and with the Data bit stream (if there is data).

The input to the decoder 60 is the aforementioned pre-compressed bit stream, which is received at input terminal 61 of the decoder 60. A context-based adaptive binary arithmetic code (CABAC) decoding component 63 performs an entropy decoding algorithm in accordance with the H.264 standard to convert the pre-compressed bit stream into syntax elements and quantized coefficients. The quantized coefficients output from the CABAC decoding component 63 are received by a Dequantizer component 65 that performs an inverse quantization algorithm, which converts the quantized coefficients into dequantized transform coefficients. The dequantized transform coefficients are received by an inverse transform component 67 that performs an inverse transform algorithm to obtain a reconstructed prediction error. This reconstructed prediction error is added by a summer 68 to either a spatial prediction output from a spatial prediction component 72 or to a motion-compensated prediction output from a motion compensation prediction component 73, depending on whether inter-frame or intra-frame prediction was used to obtain the pre-compressed bit stream received at input terminal 61. The output of the summer 68 is a decoded, i.e., reconstructed, video signal in macroblock (MB) format. The reconstructed video signal in MB format may be output at output terminal 69 or it may be deblocked by MB deblocking component 71 and then output at output terminal 74.

The CABAC decoding component 63 also outputs an indication of whether intra-frame or inter-frame prediction was used for each MB in the pre-compressed input bit stream. Intra-frame prediction refers to a coding algorithm that compresses images by using spatial information about the values of neighboring pixels within a frame to predict the values of pixels within the same frame. Inter-frame prediction refers to a coding algorithm that uses motion-compensated frames of pixels occurring earlier in time in a processing order to predict values of pixels in frames occurring later. If the CABAC decoding component 63 outputs an indication that intra-frame prediction was used to perform compression, a switch 75 selects the output of the spatial prediction component 72 to be applied to the summer 68. If the CABAC decoding component 63 outputs an indication that inter-frame prediction was used to perform compression, the switch 75 selects the output of the motion-compensation prediction component 73 to be applied to the summer 68.

A reference buffer 76 holds the most recent deblocked reference frames, which are output to the motion-compensation prediction component 73 to calculate a motion-compensation prediction. The motion-compensation prediction component 73 receives motion vector and reference index information from the CABAC decoding component 63 that the motion-compensation component 73 uses to perform prediction. The CABAC decoding component 63 also outputs other information that will be used by the re-encoder 90 to perform AVC compression and coding, such as quantization parameter (QP) information, picture and MB adaptive frame filed (AFF) information, intra- and inter-frame prediction and MB and sub-MB partitioning information, and motion vector and reference index information. This information is output from the decoder 60 by output terminals 77, 78, 79, and 81.

The output terminal 74 of the decoder 60 is coupled to an input terminal 91 of the re-encoder 90 to allow the re-encoder 90 to receive the reconstructed deblocked video signal output from the deblocking component 71. The output terminal 69 of the decoder 60 can also be the input to the re-encoder 90 at the input terminal 91. The re-encoder 90 processes the reconstructed video signal received at input terminal 91 and produces a re-encoded, i.e., compressed, video bit stream having a new bit rate. The resulting re-encoded bit stream is an AVC-compressed video bit stream, which is output at output terminal 105 of re-encoder 90 at the new, selected bit rate. It is this AVC-compressed bit stream at the new bit rate that is received by the Mux 22 shown in FIG. 2. The rate controller 30 shown in FIG. 2 adjusts certain coding parameters of the re-encoder 90, such as QP, for example, the cause the new rate to be achieved, as will be described below in detail with reference to FIGS. 4 and 5.

A subtractor 92 subtracts the received reconstructed video signal from either a spatial prediction output from a spatial prediction component 93 or from a motion-compensated prediction output from a motion-compensation prediction component 94, depending on the state of switch 95. The switch 95 is controlled by signal output from terminal 79 of the decoder 60 in the same way that the inter-frame and intra-frame indicators output from the CABAC decoding component 63 of the decoder 60 control the switch 75 of the decoder 60. The reference buffer 104 holds the most recent reference frame, which is used by the motion-compensation prediction component 94 to obtain a motion-compensated prediction. The output of the subtractor 92 is a prediction error. The prediction error is received by a transform component 96 that transforms the prediction error to obtain transform coefficients. The transform coefficients are output to a quantizer component 97, which quantizes the coefficients into quantized values. These quantized values are then output to a CABAC encoding component 98, which compresses and codes the quantized values in accordance with the H.264 AVC algorithms. The CABAC encoding component 98 outputs an AVC-compressed bit stream having a new bit rate at output terminal 105.

The re-encoder 90 also includes decoder components 99, 101, 102, 103, and 104 that essentially perform the same functions as those described above with reference to components 65, 67, 68, 71, and 76, respectively, of the decoder 60 to produce a prediction error that is subtracted from the reconstructed video signal by subtractor 92 prior to the transformation, quantization and encoding operations being performed by components 96, 97 and 98, respectively. The motion-compensation prediction component 94 of the re-encoder 90 receives the decoded motion information, such as motion vectors and associated refldx, from the output terminals 79 and 81 of decoder 60, and uses the motion information to perform motion compensation. At the output of the summer 102, any reconstructed pixel value that is more than the specific precision (for example, 8 bits in length) is clipped such that the pixel value will be within a specific range (for example, between 0 and 255).

As stated above, each re-encoder 90 adjusts its coding parameters, such as the quantization parameter, in accordance with information received from the rate controller 30 to cause the respective AVC-compressed bit streams output from the respective re-encoders 90 to have new bit rates.

Figure 4:
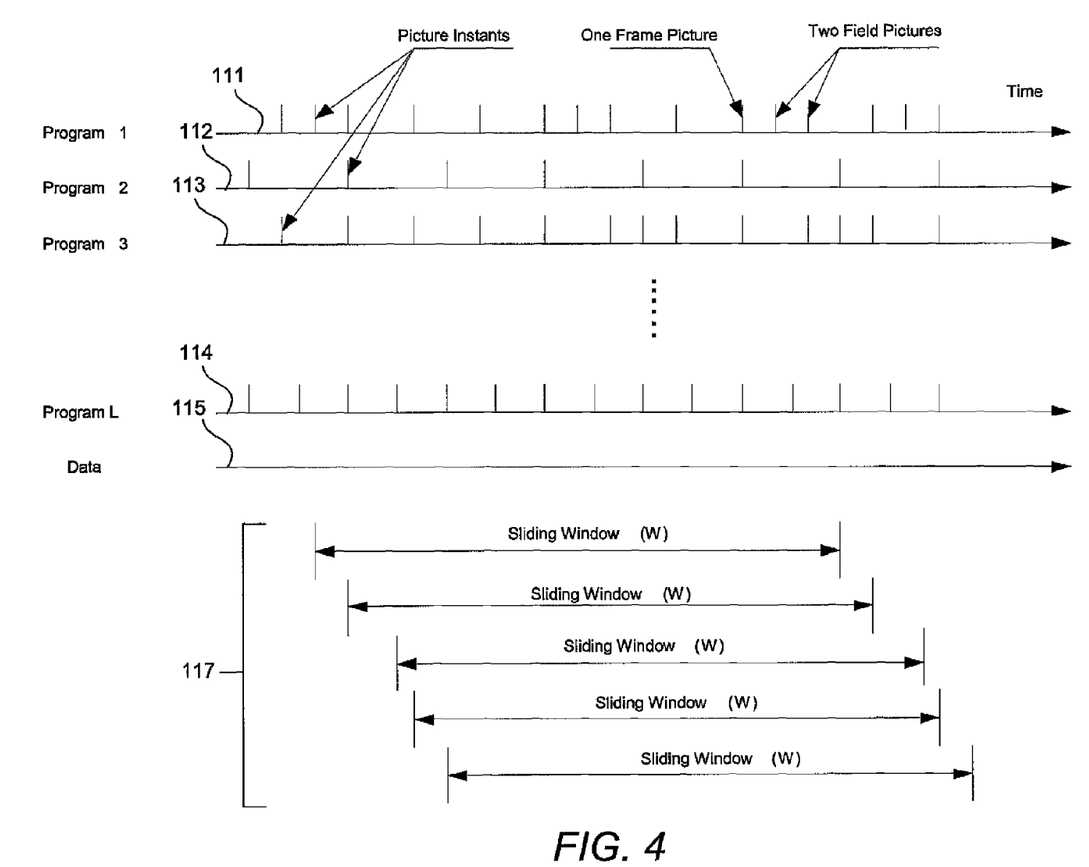
FIG. 4 illustrates timing diagrams for video bit streams corresponding to programs 1 through L shown in FIG. 2, respectively, as well as a timing diagram corresponding to Data bit stream shown in FIG. 2.

FIG. 4 illustrates timing diagrams 111, 112, 113 and 114 for video bit streams corresponding to programs 1 through L (FIG. 2), respectively, as well as a timing diagram 115 corresponding to Data bit stream (FIG. 2). FIG. 4 also illustrates a conceptual sliding window 117 that will be used to describe the manner in which the L programs are processed in the transcoders 20 (FIG. 2).

Assuming there are L pre-compressed video program bit streams fed into the StatMux system 10 shown in FIG. 2, the L programs can be at any original frame rate, such as, for example, 30 frames per second or 24 frames per second. Each frame of the L programs may be pre-encoded in either frame or field mode. Each frame or field picture can be of type I, P, Bs or B. For illustrative purposes, the following assumptions are made:

1. For the programs with the same frame rate, their frame and field picture instants are synchronized (sync).
2. A frame or field picture is transcoded within a time period equal to the reciprocal of the picture rate. For example, for a program at 30 frames per second, it takes 1/30 seconds to transcode a frame picture and 1/60 seconds to transcode a field picture. The time period during which a frame or field picture is transcoded begins at an instant in time when the picture is input into the decoder 60 (FIG. 3) and ends at an instant in time when the corresponding AVC-compressed picture is output from the re-encoder 90 (FIG. 3).
3. For a given program, the corresponding transcoder 20 (FIG. 2) moves all the compressed bits of the most recently transcoded picture into the encoder buffer (not shown) instantaneously at, and only at, a picture instant.

The sliding window 117 is shifted along the time domain at every (frame or field) picture instant of the L programs. The picture instants are indicated by the vertical lines along the timing diagrams 111-114. A variable $t_i$ corresponds to the ith picture instant, where i is a number identifying a location of a picture in a sequence. Because the L programs may have different frame rates, and because a frame can be coded as single frame picture or as two field pictures, the shift period, $\Delta_i$, will typically vary from time to time. The shift period can be defined as $\Delta_i = t_i - t_{i-1}$. Thus, $\Delta_i$ is the interval in seconds between two shift instants $t_i$ and $t_{i-1}$. It should be noted that $\Delta_i$ may not be equal to $\Delta_j$, if i≠j, where j is a number identifying a location of a picture in a sequence.

For every shift, pictures (both frame and field) of types I, P, Bs or B that were processed at the most recent picture instant are moved out the sliding window 117, and new pictures (both frame and field) of types I, P, Bs or B are moved into the sliding window 117. Given a shift instant, transcoding of the L current pictures from the L programs may not be completed and moved out the sliding window at same time. The worst-case scenario occurs when none of the L current pictures from the L programs are synchronized, where the L programs are moved out the sliding window one picture at a time.

A variable $R_{out}$ corresponds to a nominal output rate in bits per second for all of the video programs output from the transcoders 20 (FIG. 2) combined. The nominal output bit rate should not be greater than the maximum channel rate for combined video and data, $R_{max}$, output from the Mux 22 or buffer 23 onto the transmission channel 50 (FIG. 2). The actual combined output bit rate of the video programs, R, in bits per second is a variable bit rate (VBR) that is allowed to vary in a range between $R_{out}-\alpha$ and $R_{out}+\beta$, where $\alpha$ and $\beta$ are set as a percentage (e.g., 10%) of the nominal output rate $R_{out}$. The value of $\beta$ ensures a guaranteed minimum data rate of $R_{max}-(R_{out}+\beta)$. It should be noted that the term $R_{out}-\alpha$ must be greater than 0 and the term $R_{out}+\beta$ must not be greater than the maximum channel rate, $R_{max}$. The remaining bandwidth of the transmission channel 50, which is given by $R_{max}-R$, may be used for other applications, such as the data channel 40 (FIG. 2).

Figure 5:
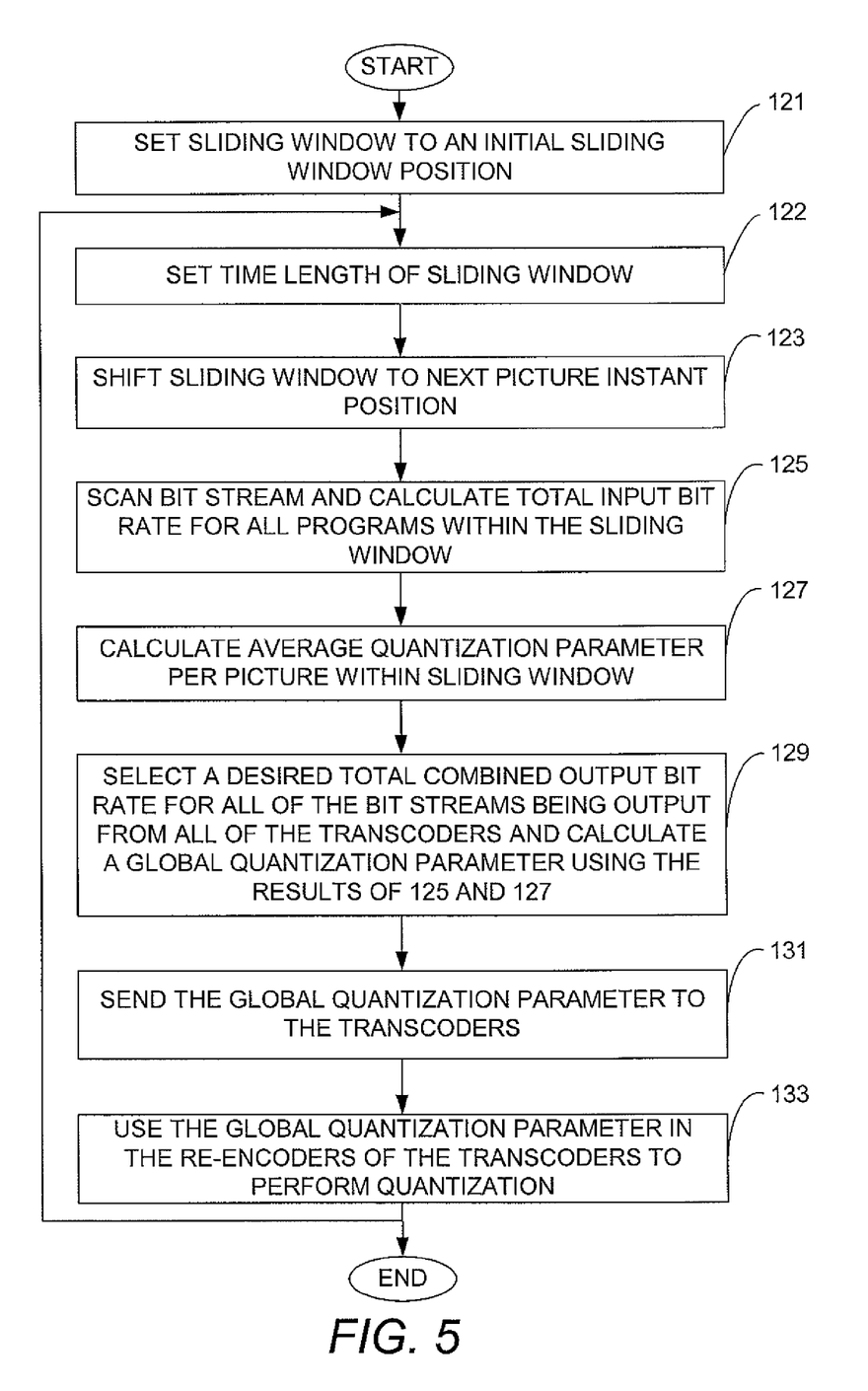
FIG. 5 illustrates a flowchart that represents the method in accordance with an illustrative embodiment performed by the rate controller shown in FIG. 2 for controllably varying the bit rates of the bit streams output from the transcoders.

FIG. 5 illustrates a flowchart that represents the method in accordance with an illustrative embodiment performed by the rate controller 30 (FIG. 2) for controllably varying R. An initial position of the sliding window 117 shown in FIG. 4 is set to be $t_{-1}$, as indicated by block 121. The sliding window is set to a time length of $T_W$ seconds for the L programs, where $T_W$ is either a constant time length that is fixed or a variable time length that varies along the time domain. This process of setting the sliding window time length is represented by block 122. The sliding window is then shifted to next picture instant, $t_i$, by incrementing the value of i to i=i+1, as indicated by block 123. It should be noted that shift instant $t_i$ is a picture instant for at least one of the L programs, but not necessarily for every one of the L programs.

After shifting the sliding window, the bit streams corresponding to pictures of the L programs are scanned within the sliding window and the total input bit rate, $R_{in}$, in bits per second for the L programs within the sliding window is calculated as, $$\bar{R}_{in} = \frac{1}{T_W} \sum_n \sum_{l=1}^{L} R_{in,l,n} \quad (1)$$

where n is a number that identifies a current picture, l is a number ranging from 1 to L that identifies a current program, and $R_{in,l,n}$ is the number of bits for picture n of program l in the input bit streams. This process is represented by block 125 in FIG. 5. It should be noted that picture n of program l is within the current sliding window and that n can be an even or odd number. If n is an even number, the picture is either a frame picture or the first field picture in the sequence. If n is an odd number, the picture is the second field picture in the sequence. At the beginning of the process represented by the flowchart shown in FIG. 5, the sliding window covers 0 seconds of the L programs, and gradually increases the covering interval until $T_W$ seconds of the L programs are covered. The sliding window will then remain covering the $T_W$ seconds of the L programs until a new sliding window is set. In accordance with an embodiment, before the sliding window reaches the constant $T_W$ seconds coverage of the L programs, $\bar{R}_{in}$ in equation (1) may use the value of the aggregate input bit rate for the first second of the L programs, which can be obtained by pre-scanning by the rate controller 30 (FIG. 2) the L input program bit streams received in the AVC transcoders 20 (FIG. 2).

As indicated by block 127 in FIG. 5, the average quantization parameter per picture type I, P, Bs or B within the sliding window is calculated as, $$\bar{Q}_{in,Ff,picType} = \frac{1}{N_{MB}} \sum_n \sum_{l=1}^{L} \sum_{i,j} Q_{in,Ff,picType,l,n}(i,j) \quad (2)$$

where $Q_{in,Ff,picType,l,n}(i,j)$ is the quantization parameter of MB (i,j) with non-zero coded block pattern (CBP) for picture n of picType $\in \{I,P,B_s,B\}$ in Ff$\in$\{frame,field\} of program l, and $N_{MB}$ is the total number of MBs with non-zero CBP in pictures of picType $\in \{I,P,B_s,B\}$ in Ff$\in$\{frame,field\} within the sliding window. The CBP is a syntax decoded from the decoder 63. In accordance with the illustrative embodiment, a macroblock (MB) consists of one 16×16 luminance block and two 8×8 chrominance blocks. The 16×16 luminance block can be considered as four 8×8 blocks. Therefore, a MB may be viewed as having six 8×8 blocks. If there are any non-zero coefficients in an 8×8 block, the 8×8 block is signed with a 1 bit. If all the coefficients for the 8×8 block are zero, the 8×8 block is signed with a 0 bit. These six bits make up a CBP.

Because $\bar{Q}_{in,Ff,picType}$ is the average quantization parameters over L programs within a sliding window, its variation should be relatively smooth from sliding window to sliding window. The L input programs may be very different. To avoid extreme cases, a program with very different complexity as compared to others should be excluded from the average quantization parameter calculation given by equation (2). The program complexity for a program, say program l, can be measured as, $$C_l = \frac{1}{N \times M} \bar{R}_{in,l} \times 2^{\frac{\bar{Q}_{in,l}-c}{6}} \quad (3)$$

where $\bar{R}_{in,l}$ and $\bar{Q}_{in,l}$ are, respectively, the bit rate and the average quantization parameter for the current sliding window, N×M is the spatial resolution of program l, and c is a constant that takes on one of six values, depending upon the quantization parameter. If a program, say program l, has a program complexity, $C_l$, that is far from the average program complexity, the program l should be excluded from the average quantization parameter calculation given by equation (2). For the illustrative example where L=4, if one of the programs has a complexity greater or smaller than the mean of the complexities of the four programs while the other three are all either smaller or greater than the mean, that program should be excluded from the average quantization parameter calculation. Otherwise, if two of the programs have complexities that are greater or smaller than the mean and the other two programs are smaller or greater than the mean, then all four programs should be included in average quantization parameter calculation. The process of calculating the program complexity and the mean program complexity and comparing the program complexity to the mean program complexity to determine whether the program should or should not be included in the average quantization parameter calculation of equation 2 is optional, but preferred.

Having obtained the results of the calculations represented by equations 1 and 2, those results are used to calculate a global quantization parameter for pictures of picType $\in \{I,P, B_s,B\}$ in Ff$\in$\{frame,field\}, as indicated by block 129. This is accomplished as follows. A term $\hat{R}_{out}$ corresponds to the average output bit rate for all the L video programs combined output from the respective transcoders 20 (FIG. 2). In order to calculate the global quantization parameter, the term $\hat{R}_{out}$ is set in the rate controller 30 (FIG. 2) to a desired average output bit rate for all the L video programs combined, and a global quantization parameter, $Q_{out,Ff,picType}$, is calculated as follows:

If $\hat{R}_{out} < \bar{R}_{in}$, $\quad (4)$ $$Q_{out,Ff,picType} = \bar{Q}_{in,Ff,picType} + 6 \times \log_2\left(\frac{\bar{R}_{in}}{\hat{R}_{out}}\right)$$

If $\hat{R}_{out} \geq \bar{R}_{in}$ $\quad (5)$ $$Q_{out,Ff,picType} = \bar{Q}_{in,Ff,picType}$$

With respect to equation 5, there is no need to change the average quantization parameter if $\hat{R}_{out} \geq \bar{R}_{in}$, in which case the new average quantization parameter is set equal to its current average decoded quantization parameter value. With respect to equation 4, this equation is based on an assumption that the complexity of a video sequence is the same before and after transcoding. Here, the video complexity is defined as the bit rate for all the combined video programs within the sliding window, R, and the corresponding average quantization step size, $Q_{stepsize}$, within the same sliding window:

$$C = R \times Q_{stepsize} \quad (6)$$

The video complexity can be expressed as, $$C = R \times 2^{\frac{Q-c}{6}} \quad (7)$$

where Q is the quantization parameter and c is a constant that takes on one of six values, depending upon the quantization step size, $Q_{stepsize}$. The following equation is true if it is assumed that the aggregate video complexity is the same before and after transcoding:

$$\hat{R}_{out} \times 2^{\frac{Q_{out,Ff,picType}-c}{6}} = \bar{R}_{in} \times 2^{\frac{Q_{in,Ff,picType}-c}{6}} \quad (8)$$

Equation (8) leads to equation (4).

After the rate controller 30 (FIG. 2) has calculated the global quantization parameter, $Q_{out,Ff,picType}$, the rate controller 30 sends this parameter to each of the AVC transcoders 20 (FIG. 2), as indicated by block 131. The transcoders 20 then apply the global quantization parameter in their respective re-encoders 90 (FIG. 3), which results in the combined video bit streams output from the transcoders 20 having the desired VBR, as indicated by block 133. The global quantization parameter $Q_{out,Ff,picType}$ is actually a set of quantization parameters that is applied to all of the current pictures (i.e., pictures within the sliding window) of picType $\in \{I,P,B_s,B\}$ in Ff$\in$ {frame,field} of the L programs. Thus, the set of global quantization parameters is applied on a per-picture basis to all of the programs. The process then returns to block 122, at which the sliding window is shifted, and then the calculations represented by blocks 125-133 are performed. The process represented by the flowchart shown in FIG. 5 continues to be performed as long as the video bit streams continue to be input to the transcoders 20 (FIG. 2).

As will be described in detail below with reference to FIG. 8, prior to the global quantization parameter being applied in the quantizer 97 (FIG. 3), this parameter may be, and preferably is, modulated (i.e. varied) in the re-encoder 90 (FIG. 3) on a local (e.g., MB) basis to achieve even better picture quality.

In general, the combined video bit stream output from the StatMux system 10 is a VBR bit stream. Because the combined video VBR bit stream must share the available bandwidth of channel 50 (FIG. 2) with the data channel 40 (FIG. 2), certain constraints preferably are imposed on the combined video VBR bit stream in order to limit its variation along the time domain. There are two typical bandwidth requirements for a data channel in digital subscriber line (DSL) systems: (1) the data rate should have a desired average data rate measured over a relatively long time period, e.g., 5 or 10 minutes, and (2) the data rate should have a guaranteed minimum data rate measured over a relatively short time period, e.g., 1 second or less. In order to meet these two data rate requirements, the output rate of the combined video VBR bit stream is monitored and measured, and if necessary, the global quantization parameter is adjusted to cause the combined video VBR bit stream to be increased or decreased accordingly.

The combined video VBR bit stream rate in bits per second is monitored and calculated over a time period of $T_i$ seconds as, $$\bar{R}_{out}(T_i) = \frac{1}{T_i} \sum_n \sum_{l=1}^{L} R_{out,l,n}. \quad (9)$$

where $R_{out,l,n}$ is the number of bits that is actually generated by using $Q_{out,Ff,picType}$ as a global quantization parameter for picture n of picType $\in \{I,P,B_s,B\}$ in Ff$\in$ {frame,field} of program l. If bin count is used, $R_{out,l,n} = \gamma \times B_{out,l,n}$, where $B_{out,l,n}$ is the number of bins that is generated using $Q_{out,Ff,picType}$ for picture n of picType $\in \{I,P,B_s,B\}$ in Ff$\in$ {frame,field} of program l and $\gamma$ is the ratio of the number of bits over the number of bins for the previous picture of the same type of program l.

To meet requirement (1) for the desired average data rate, $\bar{R}_{out}(T_i)$ is calculated and checked against the desired average output bit rate for all the L video programs combined output from the respective transcoders 20 (FIG. 2), $\hat{R}_{out}(T_i)$, over the time period of $T_i$ seconds, and the new desired average output rate over next time period of $T_{i+1}$ seconds, $\hat{R}_{out}(T_{i+1})$, is then reset as, $$\hat{R}_{out}(T_{i+1}) = R_{out} - \frac{T_i}{T_{i+1}} \times (\bar{R}_{out}(T_i) - \hat{R}_{out}(T_i)) \quad (10)$$

Both of the time periods $T_i$ and $T_{i+1}$ should be long enough to ensure that unnecessary variations in video quality are avoided. At the beginning of this process, the desired average output bit rate $\hat{R}_{out}(T_i)$ is set to the nominal output bit rate for video, that is, $$\hat{R}_{out}(T_0) = R_{out} \quad (10a)$$

In order to meet requirement (2) above (the guaranteed minimum data rate requirement), the rate controller 30 determines the combined video VBR bit stream bit rate, $\bar{R}_{out}(T_i)$, in accordance with equation 9, over a very short time period of $T_i$, e.g., less than 1 second. This calculated bit rate is then compared with bit rate threshold levels to determine whether the global quantization parameter needs to be adjusted.

In order to determine whether requirement (2) is met, four bit rate threshold levels, $R_{low}$, $R_{mid\_low}$, $R_{mid\_high}$, and $R_{high}$, are used in combination with the following constraint:

$$0 < R_{low} < R_{mid\_low} < R_{mid\_high} < R_{high} < R_{max}. \quad (11)$$

Figure 6:
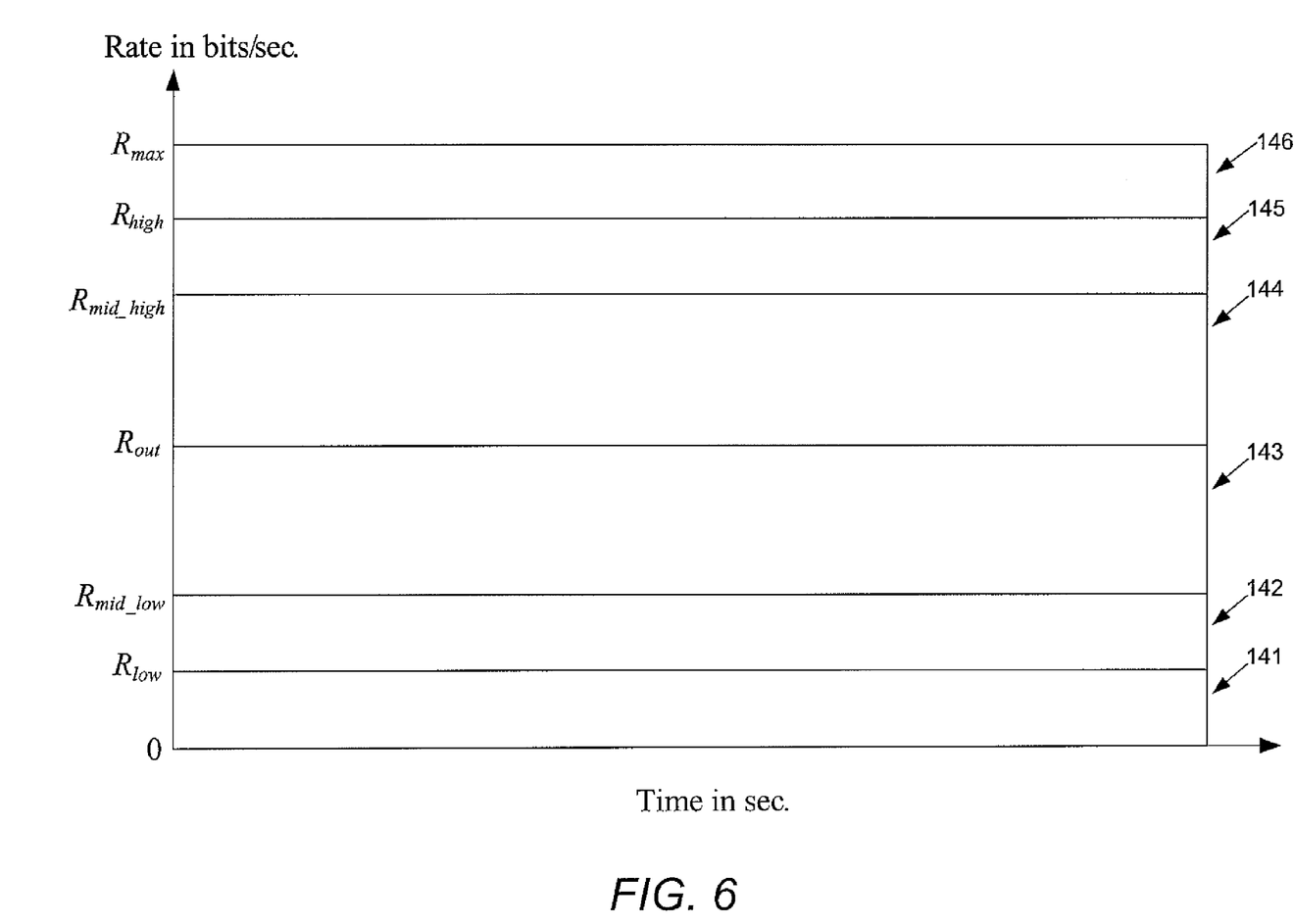
FIG. 6 illustrates a graph of the combined video VBR bit stream bit rate output from the transcoders shown in FIG. 2 as a function of time.

FIG. 6 illustrates a graph of the combined video VBR bit stream bit rate, $\bar{R}_{out}(T_i)$, as a function of time, which shows the four threshold levels. The four threshold levels divide the bandwidth of the channel 50 into six zones, labeled 141-146. The zone 146 $\{R_{max}, R_{high}\}$ corresponds to the guaranteed minimum data rate. Zones 144-146 $\{R_{max}, R_{out}\}$ corresponds to the desired average data rate.

These threshold levels are used in the following manner. If $R_{high} > \bar{R}_{out}(T_i) > R_{mid\_high}$, meaning that $\bar{R}_{out}(T_i)$ is in zone 145, a decision is made that $\bar{R}_{out}(T_i)$ needs to be decreased in order to ensure that requirement (2) is being met, which is accomplished by increasing the global quantization parameter, $Q_{out,Ff,picType}$, determined in equation 4, as, $$Q_{out,Ff,picType} = Q_{out,Ff,picType} + 6 \times \log_2\left(\frac{\bar{R}_{out}(T_i)}{R_{mid\_high}}\right). \quad (12)$$

Increasing $Q_{out,Ff,picType}$ tends to decrease $\bar{R}_{out}(T_i)$ until it is at, or below, $R_{min\_high}$. If $R_{mid\_low} > \bar{R}_{out}(T_i) < R_{low}$, meaning that $\bar{R}_{out}(T_i)$ is in zone 142, a decision is made that $\bar{R}_{out}(T_i)$ may be increased without being danger of causing requirements (1) or (2) not to be met. Hence, $Q_{out,Ff,picType}$ determined in equation 4 is decreased further as, $$Q_{out,Ff,picType} = Q_{out,Ff,picType} + 6 \times \log_2\left(\frac{\overline{R}_{out}(T_i)}{R_{mid\_low}}\right) \quad (13)$$

Decreasing $Q_{out,Ff,picType}$ in this manner tends to increase $\overline{R}_{out}(T_i)$ until it reaches or exceeds $R_{min\_low}$.

Figure 7:
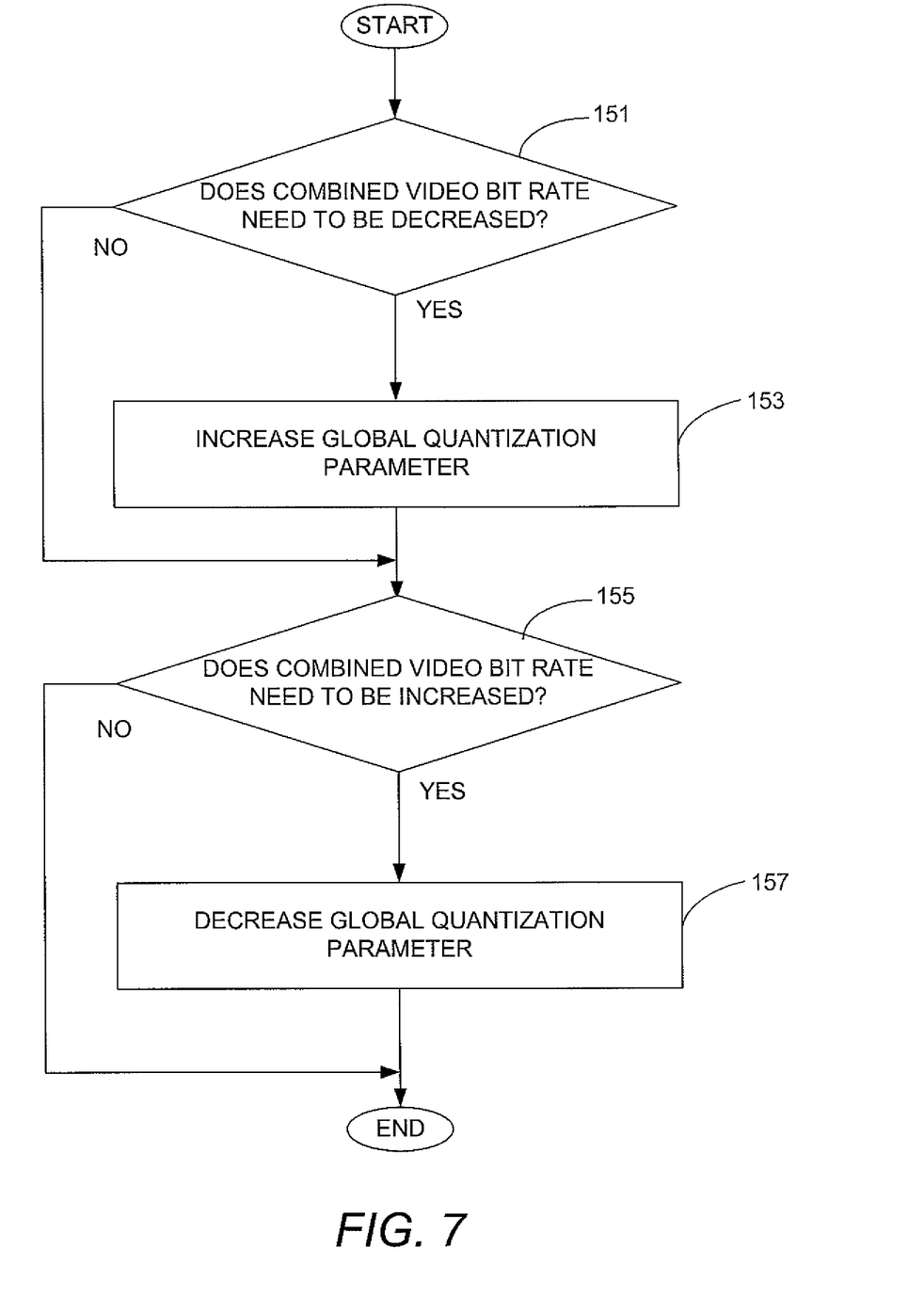
FIG. 7 illustrates a flowchart that represents the method for adjusting the combined video VBR bit stream bit rate output from the transcoders shown in FIG. 2 taking into account bandwidth needed for data that will be transmitted over the channel with the video.

FIG. 7 illustrates a flowchart that represents the method for adjusting the combined video VBR bit stream bit rate, $\overline{R}_{out}(T_i)$, by performing the processes described above with reference to equations 9-13. A determination is made as to whether or not the combined video VBR bit stream bit rate, $\overline{R}_{out}(T_i)$, needs to be decreased, as indicated by block 151. If so, the global quantization parameter, $Q_{out,Ff,picType}$, is increased, as indicated by block 153. A determination is made as to whether or not the combined video VBR bit stream bit rate, $\overline{R}_{out}(T_i)$, needs to be increased, as indicated by block 155. If so, the global quantization parameter, $Q_{out,Ff,picType}$ is decreased, as indicated by block 157. The processes represented by blocks 151-157 may be reversed in order. Also, the invention is not limited with respect to the manner in which the process represented by the flowchart shown in FIG. 7 is performed. Equations 9-13 demonstrate only one example of a suitable algorithm for performing the process represented by the flowchart shown in FIG. 7.

The process described above with reference to FIG. 5 assumes that the global quantization parameter, $Q_{out,Ff,picType}$ calculated in the rate controller 30 (FIG. 2) and sent to the transcoders 20 (FIG. 2) is used in the quantizers 97 (FIG. 3) of the re-encoders 90 (FIG. 3) to perform quantization. Alternatively, the global quantization parameter $Q_{out,Ff,picType}$ may be modulated, or varied, in the re-encoders 90 (FIG. 3) on a local basis (e.g., on an MB basis) to further improve picture quality. The manner in which this is accomplished in accordance with an illustrative embodiment is described below with reference to FIG. 8.

In accordance with the embodiment described above with reference to FIG. 5, the global quantization parameter $Q_{out,Ff,picType}$ is maintained at a relatively constant value over an entire picture sequence, subject to the rate constrains described above with reference to FIG. 7. This allows at least two goals to be achieved: 1) a single quantization parameter is applied per picture, likely resulting in smooth image quality per picture, and 2) a small variation of quantization parameter from picture to picture, resulting in only a small variation in picture quality along the time domain. On the other hand, the human visual system has different sensitivities to different frequencies. For example, the human eye tends to tolerate more distortion in higher frequencies than in lower frequencies. To address these sensitivities of the human visual system, it is common in image coding to quantize flat and uniform areas in an image more finely and to quantize busy and noisy areas in the image more coarsely.

Figure 8:
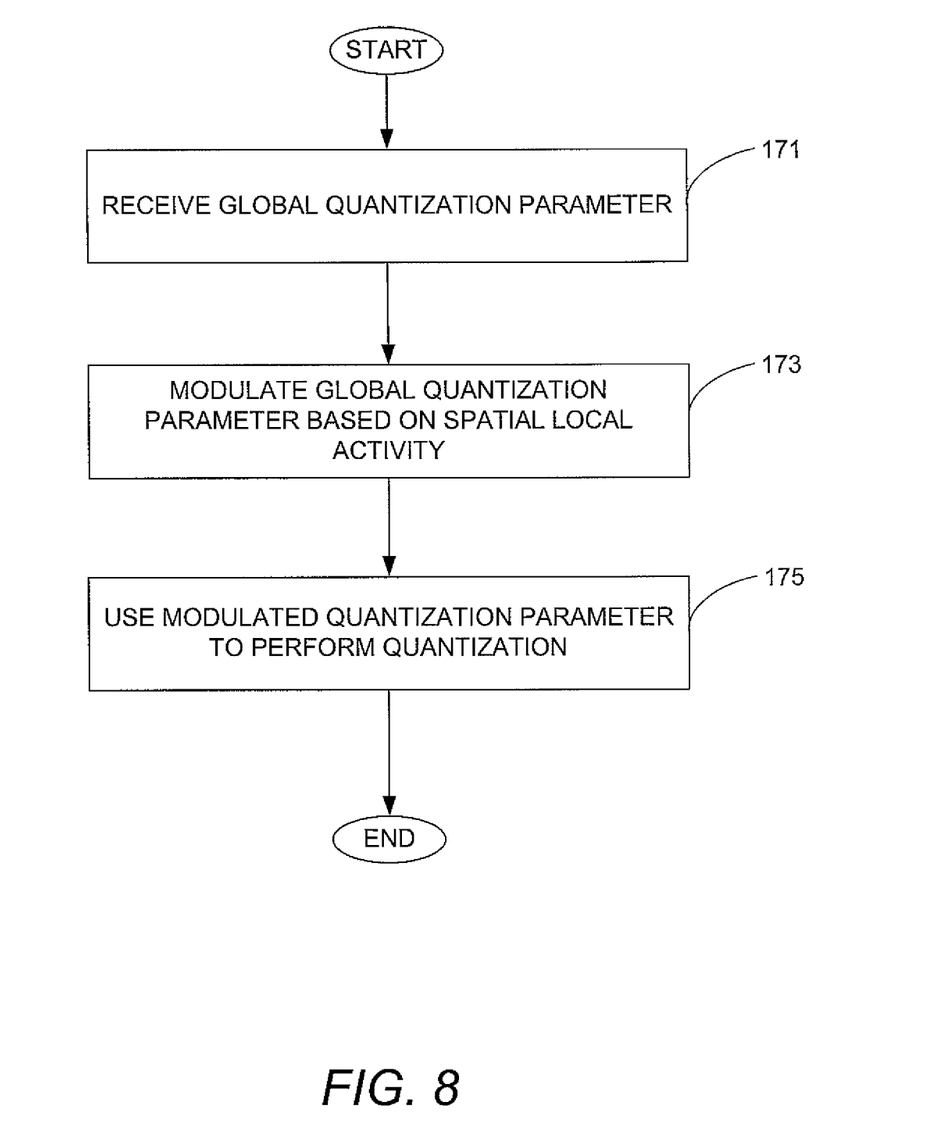
FIG. 8 illustrates a flowchart that represents the method of the invention in accordance with an embodiment for modulating the global quantization parameter obtained by the process shown in FIG. 5 based on spatial local activity.

FIG. 8 illustrates a flowchart that represents the method of the invention in accordance with an embodiment for modulating the global quantization parameter, $Q_{out,Ff,picType}$ for each MB based on the spatial local activity of the MB. This method for modulating the global quantization parameter, $Q_{out,Ff,picType}$ will typically be performed in the quantizer 97, but may be performed by any component of the transcoder 20. The global quantization parameter, $Q_{out,Ff,picType}$ is received in the transcoder 20, as indicated by block 171. The global quantization parameter, $Q_{out,Ff,picType}$ is modulated based on spatial local activity to obtain a new local quantization parameter, $Q_{out,Ff,picType,l,n}(i,j)$, as indicated by block 173. The local quantization parameter, $Q_{out,Ff,picType,l,n}(i,j)$, is then applied in the quantizer 97 (FIG. 3) to perform quantization, as indicated by block 175.

The spatial local activity for MB(i,j) of picture n of program l will be referred to herein as $act_{l,n}(i,j)$. In one embodiment, the local activity of a MB can be calculated from the reconstructed pixels at the outputs 69 or 74 of the decoder 60. The normalized local activity for MB(i,j) of picture n of program l is given by:

$$N\_act_{l,n}(i,j) = \frac{\lambda \times act_{l,n}(i,j) + avg\_act_{l,n}}{act_{l,n}(i,j) + \lambda \times avg\_act_{l,n}} \quad (14)$$

where $\lambda$ is a constant and $avg\_act_{l,n}$ is the average value of $act_{l,n}(i,j)$ for picture n of program l. The final local quantization parameter for MB(i,j) of picture n of program l that is used in the quantizer 97 to perform quantization is equal to the global quantization parameter, $Q_{out,Ff,picType}$, modulated by $N\_act_{l,n}(i,j)$, as:

$$Q_{out,Ff,picType,l,n}(i,j) = Q_{out,Ff,picType} + 6 \times \log_2(N\_act_{l,n}(i,j)) \quad (15)$$

The range of modulation is controlled by setting a value of a variable, $\beta$, in the quantizer 97, which is different from the variable, $\beta$, used in the rate controller 30 to adjust the bit rate of the combined video bit stream. For example, if $\beta$ is set to a value of 2, then $Q_{out,Ff,picType,l,n}(i,j)$ will be in the range of $\{Q_{out,Ff,picType} - 6, Q_{out,Ff,picType} + 6\}$.

Inside of each individual transcoder 20, the decoder 60 first decodes a current MB, and the re-encoder 90 then re-encodes the decoded current MB with the quantization parameter obtained at block 175 in FIG. 8. It should be noted, however, that the re-encoder 90 is not able to improve, or increase, the quality of the decoded MB. The re-encoder 90 is only able to maintain the quality of the decoded MB. Hence, there is no point in using a new local quantization parameter for a given MB that is smaller than the current decoded quantization parameter. Therefore, it is preferred that for a given MB(i,j), the new local quantization parameter $Q_{out,Ff,picType,l,n}(i,j)$ determined in accordance with equation 15 is compared against the decoded quantization received from the decoder 60. In general, if a determination is made that the new local quantization parameter is smaller than the decoded quantization parameter received from the decoder 60, the new local quantization parameter is clipped back to the old quantization parameter by a clipping algorithm. In addition, the global quantization parameter, $Q_{out,Ff,picType}$, is set to the value of the average decoded quantization parameter received from the decoder 60 shifted up by the term $$6 \times \log_2\left(\frac{\overline{R}_{in}}{\overline{R}_{out}}\right)$$

in accordance with equation 4. This shifting up of the global quantization parameter is taken into account in the clipping algorithm, which is expressed as follows, if $Q_{out,Ff,picType,l,n}(i,j) < Q_{in,Ff,picType,l,n}(i,j)$, and
   if $Q_{in,Ff,picType,l,n}(i,j) < Q_{out,Ff,picType}$, and -continued $$\text{if } Q_{in,Ff,picType,l,n}(i, j) + 6 \times \log_2\left(\frac{R_{in}}{R_{out}}\right) < Q_{out,Ff,picType}, \quad (16a)$$

$$Q_{out,Ff,picType,l,n}(i, j) = Q_{in,Ff,picType,l,n}(i, j) + 6 \times \log_2\left(\frac{R_{in}}{R_{out}}\right)$$

else
$$Q_{out,Ff,picType,l,n}(i, j) = Q_{out,Ff,picType} \quad (16b)$$
else
$$Q_{out,Ff,picType,l,n}(i, j) = Q_{in,Ff,picType,l,n}(i, j) \quad (16c)$$

The final local quantization parameter, $Q_{out,Ff,picType,l,n}(i,j)$ may be further clipped if needed to be within an allowable range of, for example, [0, 51].

It should be noted that while the principles and concepts have been described above with reference to pictures, the invention applies equally to slices. A picture may be divided into multiple slices. Each slice may be any of types I, P, Bs or B. Thus, the methods and apparatuses described above may be modified to operate on slices as opposed to pictures. Persons skilled in the art will understand, in view of the description provided herein, the manner in which such modifications may be made. Therefore, in the interest of brevity, the manner in which such modifications are made will not be described herein.

It should be noted that although the invention has been described with reference to a few illustrative embodiments, the invention is not limited to these embodiments. For example, while the StatMux system 10 has been described as being implemented in hardware, it may be implemented in hardware or software or in a combination of hardware and software or firmware. In the event that any of the algorithms described above are implemented in software, the software will typically be stored in some type of computer-readable storage device, such as, for example, random access memory (RAM), read only memory (ROM), flash memory, etc. Those skilled in the art will understand, in view of the description provided herein, the manner in which these and other modifications may be made to the embodiments described herein without deviating from the scope of the invention.

What is claimed is:

1. A method for performing statistical time division multiplexing (StatMux) in a StatMux system, the method comprising:
   receiving a plurality of video programs, each on a respective video program channels;
   transcoding each of the plurality of video programs in a respective transcoder to produce a plurality of transcoded video programs;
   outputting each of the plurality of transcoded video program from the respective transcoders at a respective bit rates;
   providing a data channel in the StatMux system that carries a stream of data bits;
   prior to multiplexing the plurality of transcoded video programs output from the transcoders with the data bit stream from the data channel, determining a target average output bit rate for the output video programs combined for a corresponding discrete period of time based on a bit rate to be allocated for transmission of said data bits in said discrete period of time,
   controllably varying an output bit rate combined for the transcoded video programs output from the transcoders by:
   calculating a total input bit rate for the input video programs within a sliding window;
   calculating an average quantization parameter based on an input bit rate for the combined video programs input from the respective transcoders over the sliding window,
   based on the target average output bit rate for the output video programs combined to the average quantization parameter, determining the set of quantization parameters to apply globally to a re-encoding process in each of the transcoders to adjust the quantization process performed in each respective transcoder for achieving the target variable bit rate of the combined video programs,
   producing respective control signals that are output to the respective transcoders, wherein each of the respective control signals output from the rate controller to the respective transcoders includes the set of quantization parameters; and
   receiving the transcoded video programs adjusted by the set of quantization parameters and a data bit stream from the data channel for multiplexing the adjusted transcoded video program bits and the data bits to produce an output bit stream of combined video bits and data bits for transmission on a transmission channel, wherein the one or more transcoded video programs and the data bits share an available bandwidth of the transmission channel.

2. The method of claim 1, further comprising:
   in a buffer of the StatMux system, receiving the bit stream of combined video and data bits output from the Mux and temporarily storing the bit stream of combined video and data bits; and
   outputting a bit stream of the combined video and data bits from the buffer onto a transmission channel, wherein a substantially constant bandwidth is allocated to the bit stream of combined video and data bits output from the buffer.

3. The method of claim 1, wherein the output bit stream of combined video and data bits output from the Mux has a bit rate that is at least substantially constant.

4. The method of claim 3, further comprising:
   in each transcoder, receiving the bits of the respective video programs on the respective program channel, the bits of the respective video programs received in the decoder being pre-compressed;
   in the decoder, decoding the pre-compressed bits and outputting a corresponding decoded video program comprising decoded video bits; and
   in a re-encoder of the transcoder, receiving the decoded video program output from the decoder and encoding the decoded video program to produce the transcoded video program that is output from the transcoder, wherein during encoding of the decoded video program in the re-encoder, a quantization component of the re-encoder uses the set of global quantization parameters contained in the control signal to perform quantization.

5. The method of claim 3, further comprising:
   in each transcoder, receiving the bits of the respective video program on the respective program channel, the bits of the respective video program received in the decoder being pre-compressed;
   in the decoder, decoding the pre-compressed bits and outputting a corresponding decoded video program comprising decoded video bits; and
   in a re-encoder of the transcoder, receiving the decoded video program output from the decoder and encoding the decoded video program to produce the transcoded video program that is output from the transcoder, wherein during encoding of the decoded video program in the re-encoder, the re-encoder processes the set of global quantization parameters contained in the control signal to obtain a set of local quantization parameters comprising at least one local quantization parameter, and wherein a quantization component of the re-encoder uses the set of local quantization parameters to perform quantization during encoding of the decoded video program.

6. The method of claim 5, wherein when the re-encoder processes the set of global quantization parameters contained in the control signal to obtain the set of local quantization parameters, the re-encoder either increases or decreases the values of the global quantization parameters of the set of global quantization parameters based on local spatial activity detected in a current group of bits being encoded by the re-encoder.

7. The method of claim 1, wherein the processing of the information received in the rate controller to produce the respective control signals that are output to the respective transcoders comprises:
initializing a sliding time window to an initial time length and to an initial picture instant position;
shifting the sliding window to a next picture instant position;
calculating a total input bit rate for all of the respective video programs on the respective video program channels within the sliding time window, each respective video program comprising pictures;
calculating an average quantization parameter per picture within the sliding time window;
selecting a total output bit rate for all of the respective video programs combined output from the respective transcoders; and
using the calculations of the total input bit rate and the average quantization parameter to calculate the set of global quantization parameters.

8. The method of claim 3, wherein prior to the respective control signals being output from the rate controller to the respective transcoders, the global quantization parameters of the set of global quantization parameters are adjusted in the rate controller if the rate controller determines that the set of global quantization parameters should be adjusted based on one or more constraints relating to bandwidth requirements for data bits transmitted over a transmission channel.

9. The method of claim 8, wherein the global quantization parameters are adjusted by increasing the values of the global quantization parameters if the rate controller determines, based on said one or more constraints, that bit rates of all of the transcoded video programs output from the respective transcoders combined should be decreased.

10. The method of claim 9, wherein the global quantization parameters are adjusted by decreasing the values of the global quantization parameters if the rate controller determines, based on said one or more constraints, that bit rates of all of the transcoded video bit streams output from the respective transcoders combined should be increased.

11. A statistical time division multiplexing (StatMux) system comprising:
one or more transcoders, each transcoder being configured to receive a respective video program comprising video bits on a respective video program channel and to transcode the respective video program to produce a respective transcoded video program comprising transcoded video bits, the respective transcoded video programs being output from the respective transcoders at respective bit rates,
a data channel that carries a stream of data bits,
a rate controller for varying over discrete periods of time an output bit rate combined for the transcoded video programs output from the transcoders;
wherein, prior to multiplexing the transcoded video programs output from the transcoders with the data bit stream from the data channel, a target average output bit rate for the output video programs combined is determined for a corresponding discrete period of time based on a bit rate to be allocated for transmission of said data bits in said discrete period of time, wherein the rate controller is configured for controllably varying an output bit rate combined for the transcoded video programs output from the transcoders by:
calculating a total input bit rate for the input video programs within a sliding window;
calculating an average quantization parameter based on an input bit rate for the combined video programs input from the respective transcoders over the sliding window,
based on the target average output bit rate for the output video programs combined to the average quantization parameter, determining the set of quantization parameters to apply globally to a re-encoding process in each of the transcoders to adjust the quantization process performed in each respective transcoder for achieving the target variable bit rate of the combined video programs,
wherein the rate controller receives information contained in the respective transcoded video programs output from the respective transcoders and information in the respective video programs received by the respective transcoders on the respective video program channels, the rate controller being configured to output respective control signals to the respective transcoders, wherein each of the respective control signals output from the rate controller to the respective transcoders includes the set of quantization parameters, and
a multiplexer (Mux) that receives the output transcoded video programs adjusted by the rate controller and a data bit stream from the data channel, the Mux configured to multiplex the adjusted transcoded video program bits and the data bits to produce an output bit stream of combined video bits and data bits for transmission on a transmission channel, wherein the one or more transcoded video programs and the data bits share an available bandwidth of the transmission channel.

12. The StatMux system of claim 11, further comprising:
a buffer that receives the bit stream of combined video and data bits output from the Mux and temporarily stores the bit stream of combined video and data bits, the buffer outputting a bit stream of the combined video and data bits onto a transmission channel, and wherein a bandwidth allocated to the stream of combined video and data bits output from the buffer is at least substantially constant.

13. The StatMux system of claim 11, wherein the output bit stream of combined video and data bits output from the Mux has a bit rate that is at least substantially constant.

14. The StatMux system of claim 13, wherein the set of global quantization parameters is updated by the rate controller and output to the transcoders in the control signals on a per-picture basis, and wherein the transcoders use the updated global quantization parameters to adjust the quantization process on a per-picture basis.

15. The StatMux system of claim 14, wherein each respective transcoder comprises:
   a decoder that receives the bits of the respective video program received on the respective program channel in the respective transcoder, the bits of the respective video program received in the decoder being pre-compressed, the decoder being configured to decode the pre-compressed bits and to output a corresponding decoded video program, the decoded video program comprising at least one decoded video sequence; and
   a re-encoder that receives the decoded video program output from the decoder, the re-encoder encoding the decoded video program to produce the transcoded video program that is output from the transcoder, the re-encoder including a quantization component that uses the set of global quantization parameters contained in the control signal to perform quantization during encoding of the decoded video program.

16. The StatMux system of claim 15, wherein the set of global quantization parameters is updated by the rate controller on a per-picture basis and output to the transcoders in the control signals on a per-picture basis, and wherein the transcoders use the updated global quantization parameters to adjust the quantization process on a per-picture basis.

17. The StatMux system of claim 15, wherein the set of global quantization parameters is adjusted in the rate controller prior to sending the set of global quantization parameters in the control signals to the transcoders if the rate controller determines that the set of global quantization parameters should be adjusted based on one or more constraints relating to bandwidth requirements for data bits transmitted over a transmission channel.

18. The StatMux system of claim 17, wherein the set of global quantization parameters is adjusted by increasing the values of the global quantization parameters if the rate controller determines, based on said one or more constraints, that bit rates of all of the transcoded video programs output from the respective transcoders combined should be decreased.

19. The StatMux system of claim 18, wherein the set of global quantization parameters is adjusted by decreasing the values of the global quantization parameters of the set if the rate controller determines, based on said one or more constraints, that bit rates of all of the transcoded video programs output from the respective transcoders combined should be increased.

20. The StatMux system of claim 19, wherein if the set of global quantization parameters is adjusted, the adjustment is made on a per-picture basis.

21. The StatMux system of claim 14, wherein each respective transcoder comprises:
   a decoder that receives the bits of the respective video program received on the respective program channel in the respective transcoder, the bits of the respective video program received in the decoder being pre-compressed, the decoder being configured to decode the pre-compressed bits and to output a corresponding decoded video program comprising decoded video at least one sequence; and
   a re-encoder that receives the decoded video program output from the decoder, the re-encoder encoding the decoded video program to produce the transcoded video program that is output from the transcoder, the re-encoder processing the set of global quantization parameters contained in the control signal to obtain a set of local quantization parameters comprising at least one local quantization parameter, the re-encoder including a quantization component that uses the set of local quantization parameters to perform quantization during encoding of the decoded video program.

22. The StatMux system of claim 21, wherein when the re-encoder processes the set of global quantization parameters contained in the control signal to obtain the set of local quantization parameters, the re-encoder either increases or decreases the values of the global quantization parameters based on local spatial activity derived from the decoded video program.

23. The StatMux system of claim 22, wherein the set of global quantization parameters are processed on a per-picture basis to obtain the set of local quantization parameters, and wherein the quantization component uses the set of local quantization parameters to perform quantization on a per-picture basis during encoding of the decoded video program.

* * * * *